US007924726B2

(12) United States Patent
White et al.

(10) Patent No.: US 7,924,726 B2
(45) Date of Patent: Apr. 12, 2011

(54) ARRANGEMENT FOR PREVENTING COUNT-TO-INFINITY IN FLOODING DISTANCE VECTOR ROUTING PROTOCOLS

(75) Inventors: Russell Ivan White, Holly Springs, NC (US); David Anthony Cook, Raleigh, NC (US); Alvaro Enrique Retana, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1847 days.

(21) Appl. No.: 10/887,919

(22) Filed: Jul. 12, 2004

(65) Prior Publication Data

US 2006/0007865 A1    Jan. 12, 2006

(51) Int. Cl.
*G01R 31/08* (2006.01)
(52) U.S. Cl. .................. 370/238; 370/254; 370/351
(58) Field of Classification Search .................. 370/225, 370/238, 244, 254, 351; 709/220, 230
See application file for complete search history.

(56) References Cited

U.S. PATENT DOCUMENTS

| | | | | |
|---|---|---|---|---|
| 5,253,248 | A * | 10/1993 | Dravida et al. | 370/228 |
| 6,118,760 | A * | 9/2000 | Zaumen et al. | 370/229 |
| 6,535,498 | B1 * | 3/2003 | Larsson et al. | 370/338 |
| 6,628,624 | B1 * | 9/2003 | Mahajan et al. | 370/256 |
| 7,035,227 | B2 * | 4/2006 | Garcia-Luna-Aceves et al. | 370/254 |
| 7,042,850 | B2 * | 5/2006 | Stewart | 370/254 |
| 2002/0023163 | A1 * | 2/2002 | Frelechoux et al. | 709/230 |
| 2003/0037167 | A1 * | 2/2003 | Garcia-Luna-Aceves et al. | 709/238 |
| 2003/0090996 | A1 | 5/2003 | Stewart | |
| 2003/0140165 | A1 | 7/2003 | Chiu et al. | |
| 2003/0202473 | A1 * | 10/2003 | Patrick et al. | 370/235 |
| 2003/0218988 | A1 * | 11/2003 | Han et al. | 370/254 |
| 2004/0039839 | A1 | 2/2004 | Kalyanaraman et al. | |
| 2004/0057440 | A1 | 3/2004 | Thubert et al. | |
| 2004/0081152 | A1 | 4/2004 | Thubert et al. | |
| 2004/0258002 | A1 * | 12/2004 | Tran et al. | 370/254 |
| 2005/0195835 | A1 | 9/2005 | Savage et al. | |
| 2005/0265259 | A1 | 12/2005 | Thubert et al. | |

OTHER PUBLICATIONS

Elizabeth M. Royer, University of California, Santa Barbara Chai-Keong Toh, Georgia Institute of technology, 1999 IEEE "A Review of current Routing Protocols for Ad Hoc Mobile Wireless Networks".*
Rabjenovic et al. (Hereafter Rabjenovic) Internal Routing Protocol Gigabit CARNet Network-Selection and Transition, Jun. 7, 2004.*
Coltun et al, "OSPP for IPv6", Network Working Group, Request for Comments: 2740, Dec. 1999.

(Continued)

*Primary Examiner* — Ricky Ngo
*Assistant Examiner* — David Oveissi
(74) *Attorney, Agent, or Firm* — Leon R. Turkevich

(57) ABSTRACT

Each router in a network is configured for generating router advertisement messages according to a flooding distance vector routing protocol. Each router advertisement message output according to the flooding distance vector routing protocol includes reachability information for at least one destination, and an originating router identifier indicating a router having originated the reachability information. If any router receiving the router advertisement message detects a match between the originating router identifier and the corresponding assigned router identifier, the received router advertisement message is disregarded during calculation of the best paths from the network. If the originating router identifier identifies another router, the router floods the received router advertisement message to other ports, and output its own router advertisement message based on the received router advertisement message and that specifies the originating router identifier from the received router advertisement message.

56 Claims, 5 Drawing Sheets

OTHER PUBLICATIONS

Coltun et al, "OSPF for IPv6", Network Working Group, Request for Comments: 2740, Dec. 1999, pp. 1-80.
Perkins, ed, "Ad Hoc Networking", 2001, pp. 20-22, 53-57, Addison-Wesley.
"Internetworking Technologies Handbook," Apr. 10, 2002, Chapter 40, pp. 40-1-40-6, Cisco Systems, Inc.
Malkin. "RIP Version 2 Carrying Additional Information", Network Working Group, Request for Comments: 1723, Nov. 1994.
Moy, "OSPF Version 2", Network Working Group, Request for Comments: 2328, Apr. 1998.
Albrightson et al., "EIGRP—A Fast Routing Protocol Based on Distance Vectors", Proc. Networld/Interop 94, 1994, XP008106882, pp. 1-13.
Hedrick, "Routing Information Protocol", Network Working Group, Request for Comments: 1058, Jun. 1988, pp. 1-33.

* cited by examiner

ARRANGEMENT FOR PREVENTING COUNT-TO-INFINITY IN FLOODING DISTANCE VECTOR ROUTING PROTOCOLS

BACKGROUND OF THE INVENTION

1. Field of the Invention

The present invention relates to transport of router advertisement messages specifying routing information between Internet Protocol (IP) routers according to a prescribed distance vector routing protocol.

2. Description of the Related Art

Wide area packet switched networks such as the Internet have become an integral part of worldwide commerce in part due to the ability of different networks to interoperate without central control. In particular, the decentralization of control is possible due to routing protocols which enable routers to communicate amongst each other and share routing information: routing protocols include operations such as router advertisement, router discovery, link state advertisement, and the sharing of all or at least a portion of respective routing tables.

Numerous routing protocols have been developed to satisfy various design requirements, including optimality (selecting the optimal route), simplicity and low overhead to minimize burden on system resources, robustness and stability (i.e., maintaining operability despite failures within the network), rapid convergence, and flexibility in adapting to network changes.

Convergence is the process of agreement, by all routers, on optimal routes. When a network event causes routes to change to either an available or unavailable state, routers will distribute routing update messages, causing recalculation of optimal routes and eventually causing all routers to agree on these routes. Routing protocols that converge slowly can cause routing loops or network outages.

Link-state protocols (also known as shortest path first protocols) flood routing information to all nodes in the network. Each router, however, sends only the portion of the routing table that describes the state of its own links. In link-state protocols, each router builds a model of the entire network topology in its routing tables. An example of a link-state protocol is Open Shortest Path First (OSPF) Protocol, described in the Internet Engineering Task Force (IETF) Request for Comments (RFC) 2328, available at the IETF website address "www.ietf.org/rfc/rfc2328.txt".

Although link-state protocols enable each router to build a topology table that provides a detailed representation of the entire network topology, link-state protocols require more system resources (e.g., CPU utilization and memory) than distance vector protocols. For example, link-state protocols such as OSPF require synchronization of all topology tables between the respective routers. In addition, OSPF requires a strict topology hierarchy, where nodes grouped into "areas" (e.g., Area 1, Area 2, Area 3, etc.), where each area can communicate only through a backbone area (Area 0), and where each area interfaces with the backbone area via at least one corresponding access border router (ABR).

Hence, the topology constraints of OSPF preclude its deployment in less-structured networks such as ad hoc networks.

Distance vector routing protocols call for each router to send all or a portion of its routing table in a routing update message at regular intervals to each of its neighboring (i.e., next-hop) routers. Hence, each router can build a topology table that provides a detailed representation of the network topology relative to the corresponding router, and a routing table that enables routing of packets according to the network topology. Hence, routers employing distance vector routing protocols send updates only to neighboring routers; consequently, a router having received an update from a neighboring router (according to a distance vector routing protocol) will be unable to determine any attributes of the network beyond the neighboring router. An example of a distance vector routing protocol is the Routing Information Protocol (RIP), described in the Internet Engineering Task Force (IETF) Request for Comments (RFC) 1723, available at the IETF website address "www.ietf.org/rfc/rfc1723.txt".

Another routing protocol is the flooding distance vector protocol, where routing update messages specifying only reachability information are flooded throughout the network, in the same manner as flooding is performed in the link-state protocols. Note, however, that flooding distance vector routing update messages do not include any topology information, but only reachability information (e.g., a given address is reachable via the router at a specified cost such as distance from the router to the destination). Further, the flooding distance vector protocol does not limit the dissemination of the routing update messages throughout the network; hence, the flooding distance vector routing protocol is susceptible to the formation of loops, where the same destination can be accessed by alternate links.

A particular problem encountered by the distance vector protocol and the flooding distance vector protocol is a "count to infinity" problem, where neighboring nodes will distribute stale information among each other, incrementing the distance to a given destination each time, until the recorded distance exceeds a maximum allowable distance (i.e., "infinity").

FIG. 1 is a diagram illustrating a network 10 having routers 12 (e.g., 12*a*, 12*b*, 12*c*, 12*d*, 12*e*, 12*f*) configured for sending routing update messages according to a flooding distance vector protocol. Assume for example that each of the routers 12 is configured for sending routing update messages according to RIP. In a standard distance vector protocol, a given router (e.g., 12*b*) would send a router advertisement message to its neighboring routers (e.g., 12*a*, 12*c*) specifying only reachability information, for example that it can reach router 12*f* at some specified cost (e.g., 1 hop). In response to receiving the router advertisement message, the neighboring routers (e.g., 12*a*, 12*c*) would output respective router advertisement messages specifying that the router 12*f* was reachable at an added cost (e.g., 2 hops). The router advertisement messages are thus propagated throughout the network 10.

If the path 14 from router 12*b* to 12*f* fails following distribution of the above-described router advertisement messages, such that the router 12*f* is not reachable by any mechanism (e.g., the router 12*f* itself fails), the router 12*b* will detect that the router 12*f* is no longer reachable via the default interface providing a cost of 1 hop: in response, the router 12*b* will install the route advertised by the router 12*a* as its default route for reaching the router 12*f*, and output an updated router advertisement message specifying that the router 12*f* is reachable via the router 12*b* at a cost of 3 hops, based on the router advertisement message from the router 12*a*. The remaining routers 12*a*, 12*c*, 12*d*, and 12*e* update their respective routing tables and output updated router advertisement messages with increasing costs; as each route to the router 12*f* is determined to be invalid (due to a time out due to inactivity of the path), the routers continually select another route to the router 12*f* and specifying an increased cost, resulting in an infinite loop that results in the "count to infinity".

Attempts at solving the problem by defining infinity to be the numerical value of fifteen ("15") have not been successful, due to the fact that the count to infinity problem still results in an unacceptable delay before network convergence is completed. Another attempt to prevent the count to the infinity problem involves implementing a hold down state for a prescribed interval before accepting alternate paths.

Assume further that the router $12e$ receives both router advertisement messages from the routers $12a$ and $12c$, and chooses the path to the destination router $12f$ via the router $12a$, as opposed to the path via the router $12d$. If the path from router $12b$ to $12f$ fails, the router $12e$ will receive an update from the router $12a$ specifying that the route is no longer reachable; once the route has been marked as unreachable, the router $12e$ can place the route in a "hold down" state, where the router $12e$ will not accept any higher cost paths to the router $12f$ from any source for at least as long as it would normally take for any false routing information to time out of the system, typically measured in terms of a prescribed number of minutes. Once this hold down state has passed, the router $12e$ can begin accepting new alternate paths towards the router $12f$ (in this case the path via the router $12d$), and install the alternate path.

In many applications such as mobile ad hoc networking, however, the hold down time is undesirable because it slows down network convergence, causing the router $12e$ to be unable to reach the router $12f$ for the entire period of the hold down interval.

The above-described columns are exacerbated in a flooded distance vector protocol, where a router floods the network not only with its own routing update message, but also with any routing update message received by that router from another router.

SUMMARY OF THE INVENTION

There is a need for an arrangement that enables reachability information to be distributed throughout a network, without the concern of initiating a count to infinity problem to a loop in the network.

There also is a need for an arrangement that provides a routing protocol enabling routers to establish an ad hoc network that provides rapid convergence, without the necessity of a tree-based network topology and which is resistant to count to infinity problems.

These and other needs are attained by the present invention, where each router in a network is configured for generating router advertisement messages according to a flooding distance vector routing protocol. Each router advertisement message output according to the flooding distance vector routing protocol includes reachability information for at least one destination, and an originating router identifier indicating a router having originated the reachability information. If any router receiving the router advertisement message detects a match between the originating router identifier and the corresponding assigned router identifier, the received router advertisement message is disregarded during calculation of the best paths from the network. If the originating router identifier identifies another router, the router floods the received router advertisement message to other ports, and output its own router advertisement message based on the received router advertisement message and that specifies the originating router identifier from the received router advertisement message.

Hence, reachability information is identified relative to an originating router identifier, enabling the originating router to identify whether received reachability information is based on stale information; consequently, reachability information can be distributed throughout a network while preventing count to infinity problems from arising due to stale information being propagated through the network.

One aspect of the present invention provides a method in a router. The method includes generating a router advertisement message according to a flooding distance vector routing protocol. The router advertisement message includes reachability information specifying at least one reachable destination and a corresponding cost, and an originating router identifier indicating a router having originated the reachability information. The method also includes outputting the router advertisement message to adjacent routers according to the flooding distance vector protocol. Outputting the router advertisement message to the adjacent routers according to the flooding distance vector protocol enables the router advertisement message to be distributed to all the routers in the network insuring distribution of routing information throughout the network. Moreover, the originating router identifier enables the routers to track the origin of the routing information, enabling the originating router to prevent a counting to infinity problem based on receiving a router advertisement message derived from stale routing information having been generated by the originating router.

Another aspect of the present invention provides a method in a router. The method includes receiving a router advertisement message that includes reachability information specifying at least one reachable destination and a corresponding first cost, and an originating router identifier indicating a router having originated the reachability information. The method also includes determining for said at least one reachable destination a corresponding second cost for reaching the reachable destination by the router, based on the corresponding first cost. The method also includes generating a second router advertisement message, based on the router advertisement message, that includes second reachability information specifying said at least one reachable destination and the corresponding second cost, and the originating router identifier. The method also includes outputting the router advertisement message and the second router advertisement message to an adjacent router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
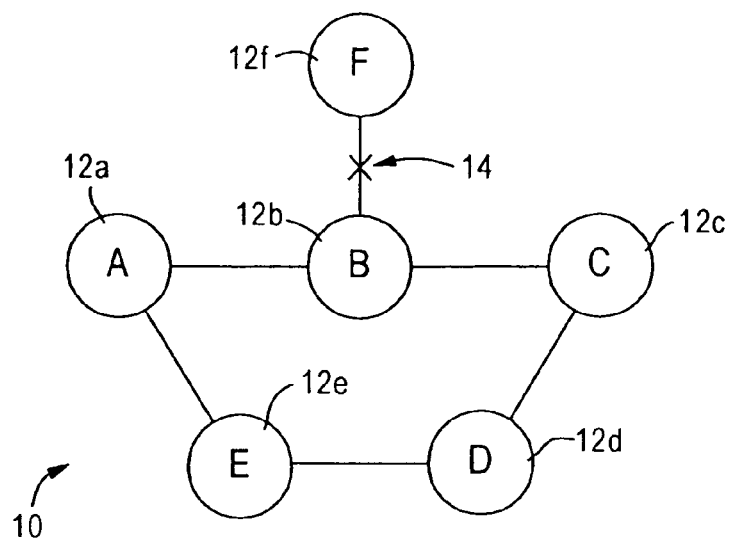
FIG. 1 is a Prior Art diagram of a network for illustration of distribution of router advertisement messages according to flooding distance vector protocol and its susceptibility to count to infinity problems.
Figure 2:
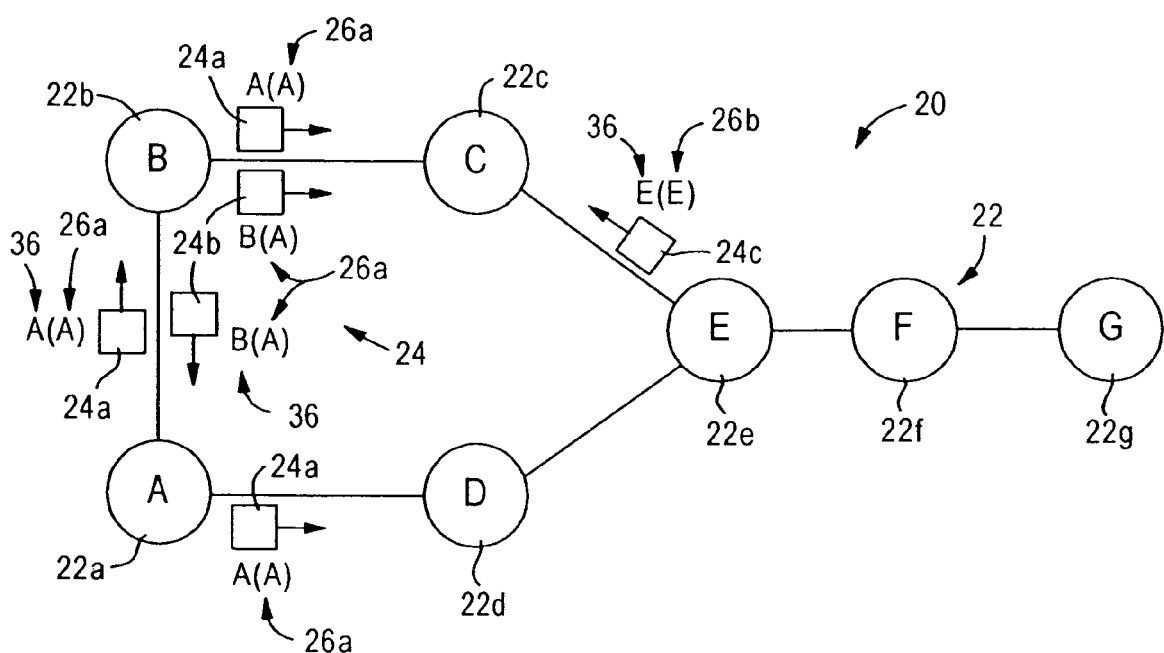
FIG. 2 is a diagram illustrating a network having routers, each configured for outputting router advertisement messages according to a flooding distance vector protocol, where each router advertisement message specifies an originating router identifier, according to an embodiment of the present invention.

FIG. 2 is a diagram illustrating a network 20 having routers 22 (e.g., 22a, 22b, 22c, 22d, 22e, 22f, 22g). Each router 22 is configured for outputting router advertisement messages 24 (e.g., 24a, 24b, 24c) according to a flooding distance vector protocol, where each router advertisement message 24 specifies an originating router identifier 26 (e.g., 26a, 26b).

Figure 3:
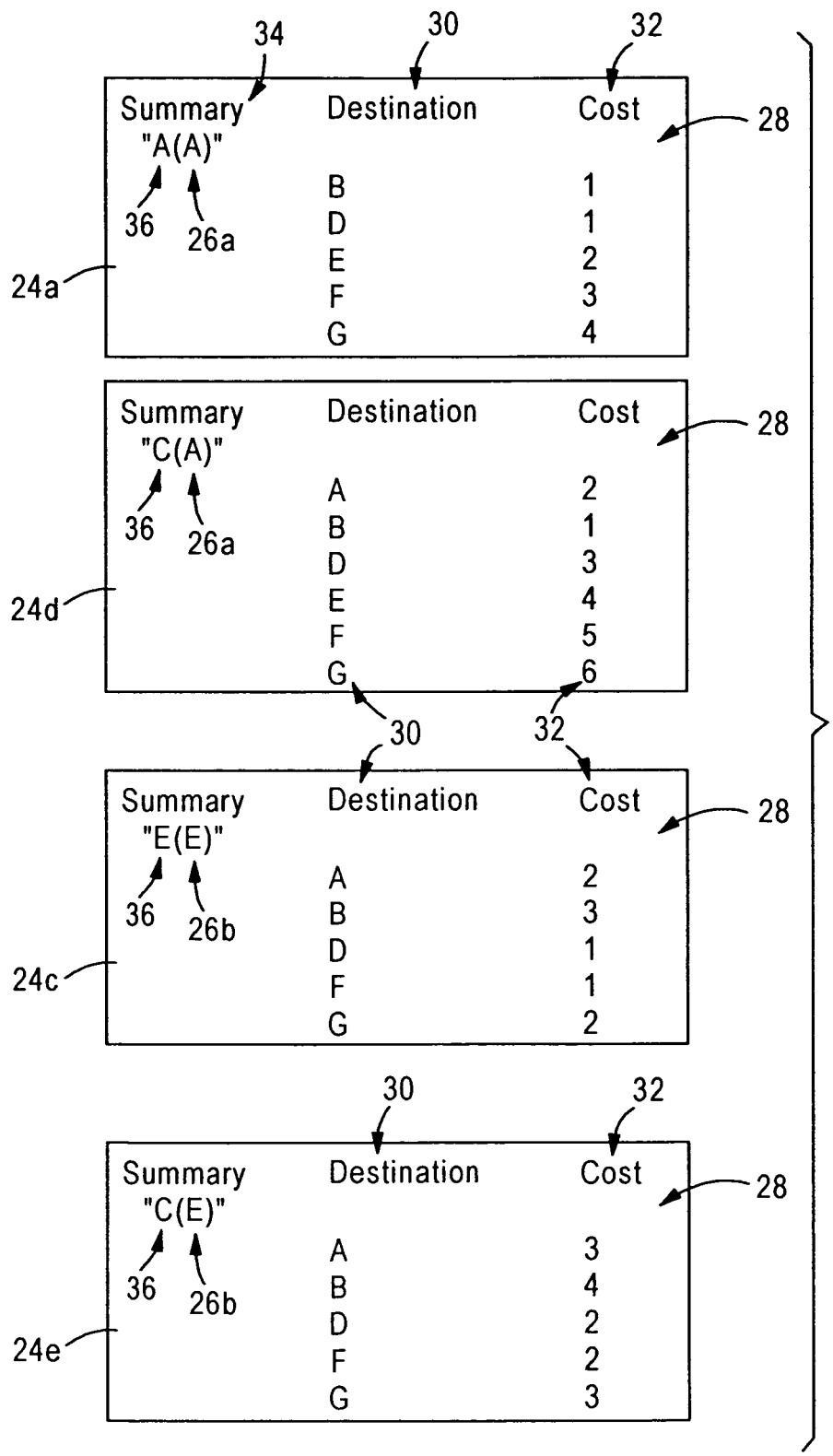
FIG. 3 is a diagram illustrating router advertisement messages having originating router identifiers indicating a router having originated the reachability information, according to an embodiment of the present invention.

As illustrated in FIG. 3, each router advertisement message (e.g., 24a) output by any one of the routers 22 according to a flooding distance vector routing protocol includes reachability information 28 that specifies at least one reachable destination 30 and a corresponding cost 32. For example, the router advertisement message 24a, originated by the router 22a, specifies that: the router 22b ("B") is reachable at a cost of one hop; the router 22d ("D") is reachable at a cost of one hop; the router 22e ("E") is reachable at a cost of two hops; the router 22f ("F") is reachable at a cost of three hops; and the router 22g ("G") is reachable at a cost of four hops.

Each router 22 generating a router advertisement message 24 according to the flooding distance vector routing protocol also inserts within the router advertisement message (e.g., 24a) an originating router identifier (e.g., 26a) that indicates the router having originated the reachability information 28 specified within the router advertisement message. As illustrated in FIG. 3, the router advertisement message 24a is identified as a summary route ("Summary") 34 generated and output by a source router 22, as specified by a source router identifier 36 ("A"), based on reachability information having been originated by an originating router ("(A)") 26a. In other words, the combined identifier "X(Y)" as used herein and in the drawings identifies two entities: the "X" identifier 36 identifies the source router having generated the specific reachability information 28 and output the router advertisement message 24; the "(Y)" identifier 26 is the originating router identifier identifying the router having originated the reachability information 28 including the destinations 30 and the cost information 32 (Y).

To further illustrate the "X(Y)" identifier, the router advertisement message 24a of FIGS. 2 and 3 includes a source router field 36 specifying the router 22a (X=A), and an originating router identifier 26a specifying that the router 22a (Y=A) originated the corresponding reachability information 28. Hence, the router 22a the originated the reachability information 28 specified in the router advertisement message 24a independent of any other reachability information distributed throughout the network 20.

In contrast, the router 22b ("B") is illustrated in FIG. 2 as receiving the router advertisement message 24a "A(A)" from the router 22a. In response to receiving the router advertisement message 24a "A(A)", the router 22b recalculates the associated cost 32 (e.g., increases the hop count by one as appropriate), updates its internal routing table entries, and outputs a new router advertisement message 24b "B(A)" that advertises the reachability and respective costs as specified in the internal routing tables of the router 22b. The router advertisement message 24b "B(A)" has a source router identifier 36 that identifies the router 22b as the source router having generated and output the reachability information (X=B); however, since the router 22b generated the corresponding reachability information based on the original reachability information having been originated by the router 22a, the router 22b specifies the originating router identifier 26a (Y=A), in order to identify that the reachability information generated by the router 22b is based on the reachability information having been originated by the router 22a.

Hence, the originating router identifier (e.g., 26a) in each router advertisement message 24 enables each router receiving the message 24 to identify the router having originated the reachability information 28. As illustrated in FIG. 2, execution of the flooding distance vector protocol causes the router 22b to output the router advertisement message 24b "B(A)" generated by the router 22b as well as the original router advertisement message 24a "A(A)" received by the router 22b and having been generated by the router 22a. Consequently, the router 22c is able to distinguish the sources of the router advertisement messages 24a and 24b based on the respective source identifiers 36, but also identify that both router advertisement messages 24a and 24b are based on the same reachability information based on having the same originating router identifier 26a.

FIG. 3 further illustrates a router advertisement message 24d having generated by the router 22c in response to receiving the router advertisement message 24b. In particular, the router 22c, in response to receiving the router advertisement message 24b from the adjacent router 22b, recalculates the associated cost 32 (e.g., increases the hop count by one as appropriate), updates its internal routing table entries, and outputs a new router advertisement message 24d "C(A)" that advertises the reachability and respective costs as specified in the internal routing tables of the router 22c. Also note that the router advertisement message 24d includes the same originating router identifier 26a (Y=A), enabling any router 22 in the network 20 to identify that the router advertisement messages 24a, 24b, and 24d specify reachability information having been originated from the same router 22a.

In contrast, the router advertisement message 24c of FIGS. 2 and 3 is both output by and originated by the router 22e, as indicated by the source identifier 36 "E" and the originating router identifier 26b "(E)", respectively. As illustrated in FIG. 3, the router 22c, in response to receiving the router advertisement message 24c, increments the associated costs and updates its internal routing tables to reflect the received router advertisement message 24c, and generates a router advertisement message 24e having a source identifier 36 "C" and originating router identifier 26b "(E)".

As described below, the use of the originating router identifiers 26 enables each router to identify the origin of the reachability information; hence, if the router 22a was to receive the router advertisement message 24d, the router 22a would be able to identify a match between its identifier and the originating router identifier 26a indicating a presence of a loop. In this case, the router 22a would disregard the router advertisement message 24d when attempting to identify an optimum path.

Figure 4:
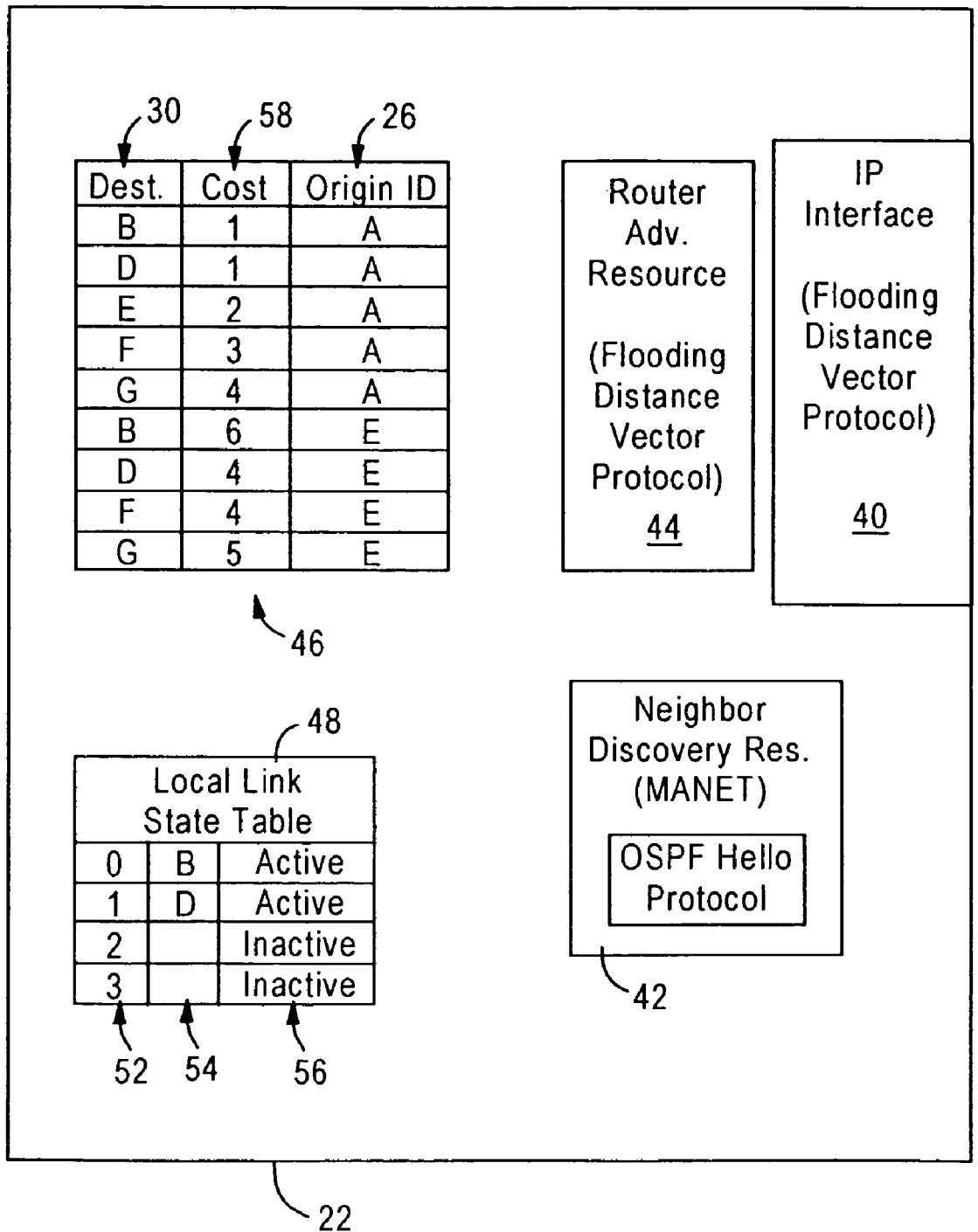
FIG. 4 is a block diagram illustrating one of the routers of FIG. 2.

FIG. 4 is a diagram illustrating one of the routers 22, according to an embodiment of the present invention. Each router 22 of the network 20 includes an Internet Protocol (IP) interface 40, a neighbor discovery resource 42, a router advertisement resource 44, a reachability table 46, and a local link state table 48. The IP interface 40 is configured for receiving router advertisement messages, and outputting router advertisement messages according to the flooding distance vector protocol. For example, in the case of the router 22b if the IP interface 40 detects reception of the router advertisement message 24a on a specific link interface port (e.g., "0"), the IP interface 40 will flood the other ports with the received router advertisement message 24a. The IP interface 40 also is configured for receiving unsolicited router advertisement messages, as well as Hello protocol messages as specified in the OSPF specification (RFC 2328).

The IP interface 40 also is configured for outputting router advertisement messages 24 having been generated by the router advertisement resource 44, described below.

The neighbor discovery resource 42 is configured for detecting adjacent routers in response to detecting unsolicited router messages from the adjacent routers, including unsolicited router advertisement messages or Hello protocol messages as specified in the OSPF specification (RFC 2328). The neighbor discovery resource 42 is configured for updating the local link state table 48 to specify the adjacent routers. In particular, the local link state table 48 includes an interface link identifier 52, a router identifier field 54, and a link status field 56.

In response to receiving unsolicited router message on one of the layer 2 links (e.g., Ethernet IEEE 802.3, Wireless LAN IEEE 802.11, etc.) having the corresponding identifier 52, the neighbor discovery resource 42 updates the local link state table 48 to specify the adjacent router in the router identifier field 54 (e.g., by IP address) detected on the corresponding interface 52, as well as the corresponding link activity; as described below, the link activity 56 may be changed from active to inactive based on a prescribed interval of inactivity. Additional information regarding implementation of the neighbor discovery resource 42 for mobile ad hoc network (MANET) protocols can be found in the Patent Application Publication US 2004/0057440 A1, published Mar. 25, 2004, and Patent Application Publication US 2004/0081152 A1, published Apr. 29, 2004, the disclosures of which are incorporated in their entirety herein by reference.

Note that the local link state table 48 stores only the link states of "local" routers (i.e., adjacent routers having direct layer 2 connections with the router 22). Hence the term "local" distinguishes from routers executing conventional link state protocols and having link state tables that store link state information for non-connected (i.e., non-local) routers; in this case, the local link state table 48 is a minimal size because it stores only the link state information for connected routers, enabling adjacent routers to share local link state table information for building of local state topology tables (as opposed to an area topology table), without substantially increasing convergence time in mobile ad hoc networks. As illustrated in FIG. 4, the router 22a would include entries in the table 48 for the neighboring routers 22b and 22d. If desired, conventional link state tables and topology tables may be added.

The router advertisement resource 44 is configured for originating entries in the reachability table 46 based on the local link state information stored in the local link state table 48, and based on exchange of local link state information with neighboring routers. For example, the routers 22a, 22d, 22e, and 22f may exchange between each other local link state information after the links have maintained an active link status for at least a prescribed link stability interval, enabling the routers to generate a local state topology table sufficient for the router advertisement resource 44 to originate the destination information 30 and the cost information 32 specified in the router advertisement message 24a. Hence, the router advertisement resource 44 is configured for originating the reachability information for the router advertisement message 24a based on the local link state table 48, and storing the reachability information in the reachability table 46 specifying the destination information 30, the cost information in the cost field 58, and its originating router identifier 26a in the origin identifier field 26.

The router advertisement resource 44 also is configured for determining, from a router advertisement message received by the IP interface 40, an updated cost 58 for a reachable destination 30 specified in the received router advertisement message based on the originally specified cost 32. If the router advertisement resource 44 determines that the reachability information was originated by another router, the router advertisement resource 44 adds the reachable destination information 30 specified in the received router advertisement message, along with the updated cost 58, in the reachability table 46. The table 46 of FIG. 4 illustrates reachability information that would be stored in the router 22a.

The router advertisement resource 44 executes a router optimization algorithm to identify best path (e.g., Open Shortest Path First (OSPF) per RFC 2328), and generates a new router advertisement message based on the originally-received router advertisement message. Hence, the disclosed router advertisement resource 44 will also include additional routing protocol resource for managing the summary table 46 and performing route optimization.

As described above, the new router advertisement message includes the originating router identifier 26 from the received router advertisement message to indicate that the reachability information was originated by another router.

Figure 5:
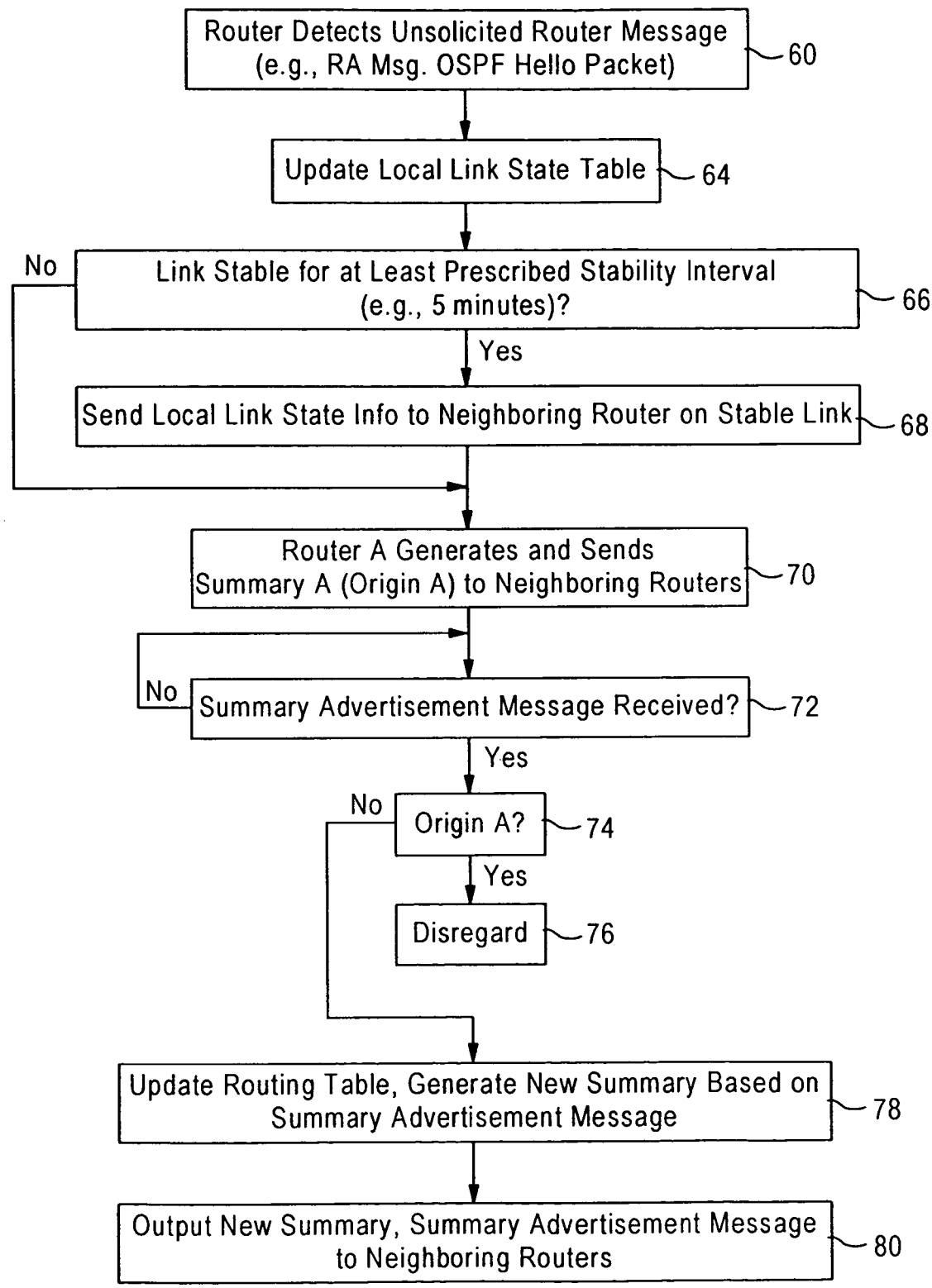
FIG. 5 is a diagram illustrating the method in each router of receiving, processing, and generating router advertisement messages, according to an embodiment of the present invention.

FIG. 5 is a diagram illustrating the method of receiving and generating router advertisement messages including reachability information and an originating router identifier, according to an embodiment of the present invention. The steps described below with respect to FIG. 5 can be implemented in the gateways as executable code stored on a computer readable medium (e.g., floppy disk, hard disk, EEPROM, CD-ROM, nonvolatile RAM, etc.), or propagated via a computer readable transmission medium (e.g., fiber optic cable, electrically-conductive transmission line medium, wireless electromagnetic medium, etc.).

The method in each router 22 begins in step 60, where the neighbor discovery resource 42 detects via the IP interface 40 an unsolicited router message, for example a router advertisement message, or an OSPF Hello packet. The neighbor discovery resource 42 updates in step 64 the local link state table 48 reflecting detection of the neighboring router. If the link is determined in step 66 to be stable for at least a prescribed stability interval (e.g., five minutes), the neighbor discovery resource 42 outputs in step 68 the local link state information from the table 48 to the neighboring router via the IP interface 40.

Based on the local link state information in the table 48, the router (e.g., 22a) originates the reachability information 28 and generates in step 70 the router advertisement message 24a specifying the originating router identifier 26a, and outputs via the IP interface 40 the router advertisement message to the adjacent routers according to the flooding distance sector protocol.

If in step 72 the router advertisement resource 44 receives via the IP interface 40 a summary advertisement message 24, the router advertisement resource 44 checks in step 74 if the originating router identifier 26 specified in the received router advertisement message corresponds to the router identifier; for example, if the router 22a "A" detects that the router advertisement message 24d has an originating router identifier 26a that corresponds to the router identity, the router advertisement resource 44 disregards in step 76 the router advertisement message. Otherwise, if the originating router identifier 26 does not correspond to the router, the router advertisement resource 44 determines in step 78 an updated cost for the reachable destination information specified in the received router advertisement message, updates the routing table 46, and generates a new summary router advertisement message 24 that includes the updated reachability information and the originating router identifier from the received router advertisement message. The router advertisement resource 44 outputs via the IP interface 40 the new summary router advertisement message, as well as the received summary advertisement message, to the neighboring routers in step 80.

Figure 6:
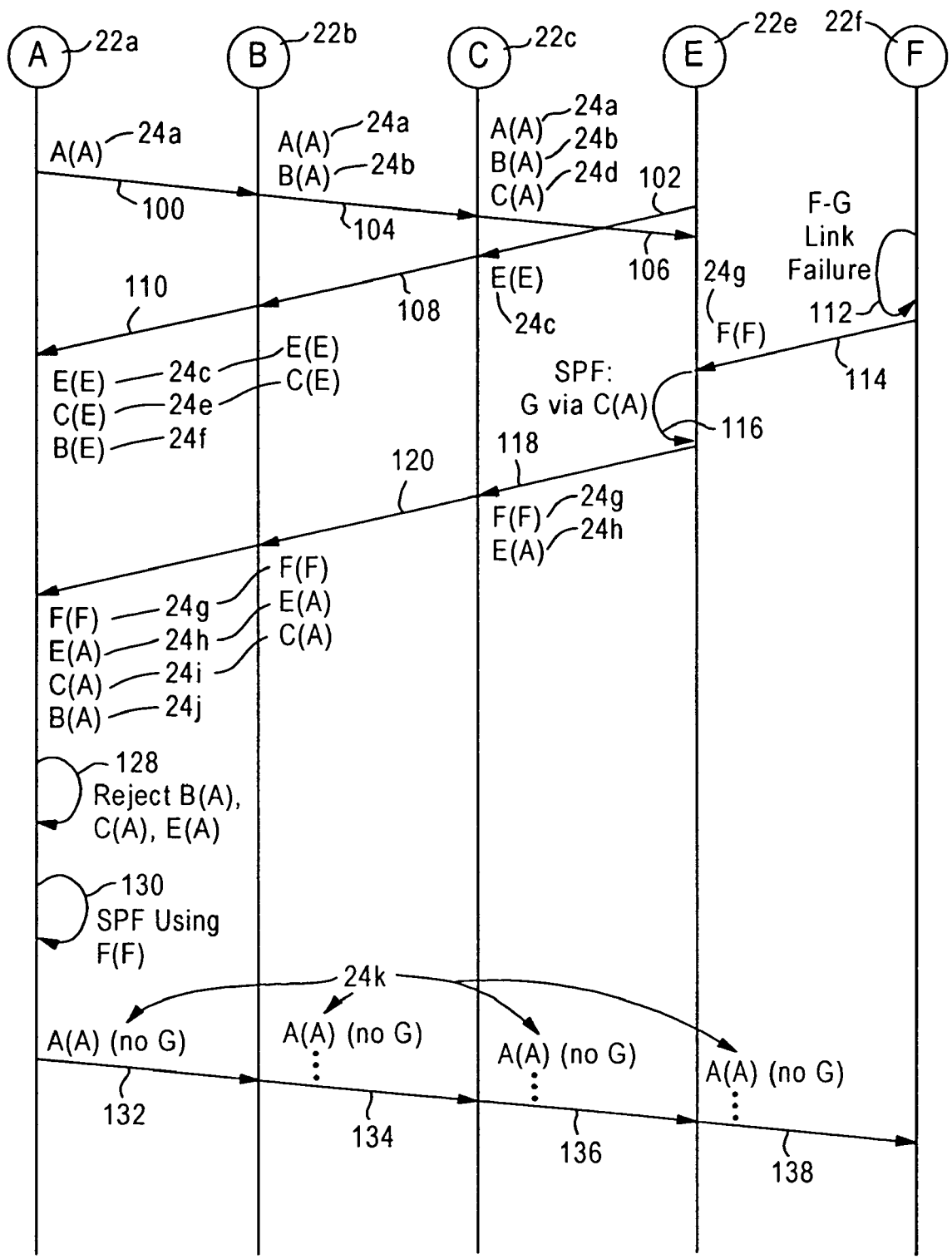
FIG. 6 is a diagram illustrating transfer of router advertisement messages between exemplary routers from the network of FIG. 2, according to an embodiment of the present invention.

FIG. 6 is a diagram illustrating transfer of router advertisement messages between exemplary routers 22a, 22b, 22c, 22e, and 22f from the network 20 of FIG. 2, according to an embodiment of the present invention. As described above, each of the routers 22 implement the method as described above with respect to FIG. 5. As such, the the routers 22 may exchange local link state information during initial formation of the network.

As illustrated in FIG. 6, the router 22a outputs at event 100 the router advertisement message 24a "A(A)". The router 22b responds to the router advertisement message 24a "A(A)" by updating its internal reachability table 46, and outputting at event 104 the router advertisement messages 24a "A(A)" and 24b "B(A)" to the router 22c, and the router advertisement message 24b "B(A)" back to the router 22a (not shown). As described above, the router 22b specifies within the router advertisement message 24b "B(A)" the originating router identifier 26a to identify the router 22a as the originating router.

The router 22c responds to the router advertisement messages 24a "A(A)" and 24b "B(A)" by updating its internal reachability table 46, and generating/outputting at event 106 the router advertisement message 24d "C(A)" to the adjacent routers 22b (not shown) and 22e; the router 22c also forwards the received router advertisement messages 24a "A(A)" and 24b "B(A)" to the router 22e.

Note that the router 22b may determine that forwarding the router advertisement message 24d "C(A)" back to the router 22a may not be necessary based on all the router advertisement messages sharing the same originating router identifier 26a "(A)". Hence, subsequent forwarding of generated router advertisement messages back to a router having sent a router advertisement message will be omitted for reduced complexity in describing the events of FIG. 6.

The router 22e independently originates and outputs its own router advertisement message 24c "E(E)" at event 102. The router 22c generates and outputs at event 108 the router advertisement message 24e "C(E)" to routers 22b and 22e (not shown), and also forwards the received router advertisement message 24c "E(E)" to the router 22b. The router 22b generates and outputs at event 110 the router advertisement message 24f "B(E)" to routers 22a and 22c (not shown), and also forwards the received router advertisement messages 24c "E(E)" and 24e "C(E)" to the router 22a. In this case, the router 22a does not discard the router advertisement messages 24c, 24e, and 24f because they each specify an originating router identifier 26b of another router; rather, the router 22a updates cost information, and adds the relevant entries to the reachability table 46.

Assume at event 112 that the router 22f detects a link failure in the link between the routers 22f and 22g. In response to detecting link failure, the router 22f updates its internal reachability table 46 to specify the router 22g is no longer reachable, and originates at event 114 a new router advertisement message 24g "F(F)" specifying that the router 22g is no longer reachable. The router 22e responds to the router advertisement message 24g "F(F)" by executing a shortest path first (SPF) routine at event 116 in order to identify an alternative path, and finds its only path remaining is via the router advertisement message 24a "C(A)". The router 22e installs the route to the router 12g in its internal reachability table 46, rebuilds its summary as the router advertisement message 24h "E(A)", and outputs the router advertisement message 24h and 24g to the router 22c at event 118. As described above, the router 22e floods the router advertisement messages throughout the network.

The router 22c receives the new summary 24h, determines that it supersedes the current copy of the summary "C(E)" 24e stored in its local table 46. The router 22c recalculates the best paths through the network 20, builds a new summary 24i "C(A)", and floods at event 120 the router advertisement messages 24g, 24h, and 24i.

The process is repeated by router 22b: the router 22b receives the new summary 24i, and determines that it supersedes the current copy of the summary "B(E)" 24f stored in its local table 46. The router 22b recalculates the best paths through the network 20, builds a new summary 24j "B(A)", and floods at event 124 the router advertisement messages 24g, 24h, 24i, and 24j.

The router 22a disregards the router advertisement messages 24h, 24i, and 24j at event 128 (by marking each of these advertisement as unusable) based on determining that the originating router identifier 26a specified in each of the router advertisement messages 24h, 24i, and 24j corresponds to the identifier for the router 22a.

However, the router 22a determines at event 130 that the originating router identifier 26 specified in the router advertisement message 24g "F(F)" does not correspond to the identifier "A" of the router 22a. Hence, the router 22a processes the summary 24g by calculating the best path to reachable destinations within the network 20, and determines that it can no longer reach the router 22g. Hence, the router 22a originates a new summary "A(A)" 24k that does not include the router 22g as a reachable destination, and floods the network 20 with the new summary 24k at event 132. The routers 22b, 22c, and 22e similarly flood the network at events 134, 136, and 138, respectively, propagating the new summary 24k throughout the network.

Hence, the reachability to the router 22g has been completely removed from each of the routers 22 in the network 20, enabling efficient convergence without encountering the count to infinity problem.

According to the disclosed embodiment, a flooding distant sector running protocol can be implemented in a manner that ensures that counting to infinity problems are avoided.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router, the method comprising:
generating by the router a router advertisement message according to a flooding distance vector routing protocol, the router advertisement message including reachability information specifying at least one reachable destination and a corresponding cost for reaching the at least one reachable destination, a source router identifier identifying the router as having generated and output the reachability information, and an originating router identifier indicating a router having originated the reachability information independent of any other reachability information; and outputting by the router the router advertisement message to adjacent routers according to the flooding distance vector routing protocol.

2. The method of claim 1, further comprising:
detecting the adjacent routers in response to detecting respective unsolicited router messages from the adjacent routers;
connecting to the adjacent routers via respective interface links; and
updating a local link state table, configured for identifying connected adjacent routers, to specify the adjacent routers, the respective interface links, and respective link status.

3. The method of claim 2, further comprising outputting to one of the adjacent routers the local link state table based on determining the corresponding interface link has maintained an active link status for at least a prescribed link stability interval.

4. The method of claim 2, wherein the generating includes originating the reachability information based on the local link state table, the originating router identifier assigned to and identifying the router.

5. The method of claim 1, further comprising:
receiving by the router from one of the adjacent routers a second router advertisement message according to the flooding distance vector routing protocol and that specifies the at least one reachable destination and a corresponding second cost, and the originating router identifier;
the generating including:
(1) disregarding the second router advertisement message based on determining the originating router identifier specified in the second router advertisement message corresponds to a router identity of the router, and
(2) based on determining the originating router identifier specified in the second router advertisement message does not correspond to the router identity of the router, determining the cost for the reachable destination specified in the router advertisement message based on the second cost specified in the second router advertisement message, and storing in a routing table entry the reachable destination, the corresponding cost, and the originating router identifier.

6. The method of claim 5, further comprising outputting the second router advertisement to others of the adjacent routers according to the flooding distance vector routing protocol.

7. The method of claim 1, wherein the router is a mobile router configured for attaching to a mobile ad hoc network.

8. A method in a router, the method comprising:
receiving by the router a router advertisement message that includes reachability information specifying at least one reachable destination and a corresponding first cost, a source router identifier identifying a router having generated and output the reachability information, and an originating router identifier indicating a router having originated the reachability information independent of any other reachability information;
determining by the router for said at least one reachable destination a corresponding second cost for reaching the reachable destination by the router, based on the corresponding first cost;
generating by the router a second router advertisement message, based on the router advertisement message, that includes second reachability information specifying said at least one reachable destination and the corresponding second cost, a second source router identifier identifying the router as having generated and output the second reachability information, and the originating router identifier; and
outputting by the router the router advertisement message and the second router advertisement message to an adjacent router according to a flooding distance vector routing protocol.

9. The method of claim 8, further comprising:
detecting the adjacent router in response to detecting an unsolicited router message from the adjacent router;
connecting to the adjacent router via an interface link; and
updating a local link state table, configured for identifying connected adjacent routers, to specify the adjacent router, the corresponding interface link, and a corresponding link status.

10. The method of claim 9, further comprising outputting to the adjacent router the local link state table based on determining the corresponding interface link has maintained an active link status for at least a prescribed link stability interval.

11. The method of claim 9, further comprising:
originating third reachability information based on the local link state table;
generating a third router advertisement message that includes the third reachability information for a prescribed destination, the originating router identifier for the third router advertisement message identifying said router as the router having originated the reachability information; and
outputting the third router advertisement message to the adjacent router.

12. The method of claim 11, wherein the third reachability information specifies that the prescribed destination is unreachable.

13. The method of claim 11, wherein the router advertisement message, the second router advertisement message, and the third router advertisement message each are output according to the flooding distance vector routing protocol.

14. The method of claim 8, wherein the router is a mobile router configured for attaching to a mobile ad hoc network.

15. A router comprising:
means for generating a router advertisement message according to a flooding distance vector routing protocol, the router advertisement message including reachability information specifying at least one reachable destination and a corresponding cost for reaching the at least one reachable destination, a source router identifier identifying the router as having generated and output the reachability information, and an originating router identifier indicating a router having originated the reachability information independent of any other reachability information; and
means for outputting the router advertisement message to adjacent routers according to the flooding distance vector routing protocol.

16. The router of claim 15, further comprising:
means for detecting the adjacent routers in response to detecting respective unsolicited router messages from the adjacent routers, the means for detecting further configured for connecting to the adjacent routers via respective interface links, and a local link state table configured for identifying connected adjacent routers, the means for detecting configured for updating the local link state table to specify the adjacent routers, the respective interface links, and respective link status.

17. The router of claim 16, wherein the means for outputting is configured for outputting to one of the adjacent routers the local link state table based on the means for generating having determined that the corresponding interface link has maintained an active link status for at least a prescribed link stability interval.

18. The router of claim 16, wherein the means for generating is configured for originating the reachability information based on the local link state table, the originating router identifier assigned to and identifying the router.

19. The router of claim 15, wherein:
the means for outputting is configured for receiving from one of the adjacent routers a second router advertisement message according to the flooding distance vector routing protocol and that specifies the at least one reachable destination and a corresponding second cost, and the originating router identifier;
the means for generating is configured for:
(1) disregarding the second router advertisement message based on determining the originating router identifier specified in the second router advertisement message corresponds to a router identity of the router, and
(2) based on determining the originating router identifier specified in the second router advertisement message does not correspond to the router identity of the router, determining the cost for the reachable destination specified in the router advertisement message based on the second cost specified in the second router advertisement message, and storing in a routing table entry the reachable destination, the corresponding cost, and the originating router identifier.

20. The router of claim 19, wherein the means for outputting is configured for outputting the second router advertisement to others of the adjacent routers according to the flooding distance vector routing protocol.

21. The router of claim 15, wherein the router is a mobile router configured for attaching to a mobile ad hoc network.

22. A router comprising:
means for receiving a router advertisement message that includes reachability information specifying at least one reachable destination and a corresponding first cost, a source router identifier identifying a router having generated and output the reachability information, and an originating router identifier indicating a router having originated the reachability information independent of any other reachability information;
means for determining for said at least one reachable destination a corresponding second cost for reaching the reachable destination by the router, based on the corresponding first cost, the means for determining configured for generating a second router advertisement message, based on the router advertisement message, that includes second reachability information specifying said at least one reachable destination and the corresponding second cost, a second source router identifier identifying the router as having generated and output the second reachability information, and the originating router identifier;
the means for receiving further configured for outputting the router advertisement message and the second router advertisement message to an adjacent router according to a flooding distance vector routing protocol.

23. The router of claim 22, further comprising:
means for detecting the adjacent router in response to detecting an unsolicited router message from the adjacent router, the means for detecting further configured for connecting to the adjacent router via an interface link; and
a local link state table configured for identifying connected adjacent routers, the means for detecting configured for updating the local link state table to specify the adjacent router, the corresponding interface link, and a corresponding link status.

24. The router of claim 23, wherein the means for receiving is configured for outputting to the adjacent router the local link state table based on determining the corresponding interface link has maintained an active link status for at least a prescribed link stability interval.

25. The router of claim 23, wherein:
the means for determining is configured for originating third reachability information based on the local link state table, and generating a third router advertisement message that includes the third reachability information for a prescribed destination, the originating router identifier for the third router advertisement message identifying said router as the router having originated the reachability information;
the means for receiving configured for outputting the third router advertisement message to the adjacent router.

26. The router of claim 25, wherein the third reachability information specifies that the prescribed destination is unreachable.

27. The router of claim 25, wherein the means for receiving is configured for outputting the router advertisement message, the second router advertisement message, and the third router advertisement message according to the flooding distance vector routing protocol.

28. The router of claim 22, wherein the router is a mobile router configured for attaching to a mobile ad hoc network.

29. A network having a plurality of routers, each router configured for:
generating a router advertisement message according to a flooding distance vector routing protocol, the router advertisement message including reachability information specifying at least one reachable destination and a corresponding cost for reaching the at least one reachable destination, a source router identifier identifying the router as having generated and output the reachability information, and an originating router identifier indicating a router having originated the reachability information independent of any other reachability information; and
outputting the router advertisement message to adjacent routers according to the flooding distance vector routing protocol.

30. The network of claim 29, each router further configured for:
detecting the adjacent routers in response to detecting respective unsolicited router messages from the adjacent routers;
connecting to the adjacent routers via respective interface links; and
updating a local link state table, configured for identifying connected adjacent routers, to specify the adjacent routers, the respective interface links, and respective link status.

31. The network of claim 30, each router further configured for outputting to one of the adjacent routers the local link state table based on determining the corresponding interface link has maintained an active link status for at least a prescribed link stability interval.

32. The network of claim 30, wherein the generating includes originating the reachability information based on the local link state table, the originating router identifier assigned to and identifying the router.

33. The network of claim 29, each router further configured for:
receiving from one of the adjacent routers a second router advertisement message according to the flooding distance vector routing protocol and that specifies the at least one reachable destination and a corresponding second cost, and the originating router identifier;
the generating including:
(1) disregarding the second router advertisement message based on determining the originating router identifier specified in the second router advertisement message corresponds to a router identity of the router, and
(2) based on determining the originating router identifier specified in the second router advertisement message does not correspond to the router identity of the router, determining the cost for the reachable destination specified in the router advertisement message based on the second cost specified in the second router advertisement message, and storing in a routing table entry the reachable destination, the corresponding cost, and the originating router identifier.

34. The network of claim 33, each router further configured for outputting the second router advertisement to others of the adjacent routers according to the flooding distance vector routing protocol.

35. The network of claim 29, wherein at least one of the routers is a mobile router configured for attaching according to a mobile ad hoc network protocol.

36. A network having a plurality of routers, each router comprising:
means for generating a router advertisement message according to a flooding distance vector routing protocol, the router advertisement message including reachability information specifying at least one reachable destination and a corresponding cost for reaching the at least one reachable destination, a source router identifier identifying the router as having generated and output the reachability information, and an originating router identifier indicating a router having originated the reachability information independent of any other reachability information; and
means for outputting the router advertisement message to adjacent routers according to the flooding distance vector routing protocol.

37. The network of claim 36, each router further comprising:
means for detecting the adjacent routers in response to detecting respective unsolicited router messages from the adjacent routers, the means for detecting further configured for connecting to the adjacent routers via respective interface links, and
a local link state table configured for identifying connected adjacent routers, the means for detecting configured for updating the local link state table to specify the adjacent routers, the respective interface links, and respective link status.

38. The network of claim 37, wherein the means for outputting is configured for outputting to one of the adjacent routers the local link state table based on the means for generating having determined that the corresponding interface link has maintained an active link status for at least a prescribed link stability interval.

39. The network of claim 37, wherein the means for generating is configured for originating the reachability information based on the local link state table, the originating router identifier assigned to and identifying the router.

40. The network of claim 36, wherein:
the means for outputting is configured for receiving from one of the adjacent routers a second router advertisement message according to the flooding distance vector routing protocol and that specifies the at least one reachable destination and a corresponding second cost, and the originating router identifier;
the means for generating is configured for:
(1) disregarding the second router advertisement message based on determining the originating router identifier specified in the second router advertisement message corresponds to a router identity of the router, and
(2) based on determining the originating router identifier specified in the second router advertisement message does not correspond to the router identity of the router, determining the cost for the reachable destination specified in the router advertisement message based on the second cost specified in the second router advertisement message, and storing in a routing table entry the reachable destination, the corresponding cost, and the originating router identifier.

41. The network of claim 40, wherein the means for outputting is configured for outputting the second router advertisement to others of the adjacent routers according to the flooding distance vector routing protocol.

42. The network of claim 36, wherein at least one of the routers is a mobile router configured for attaching according to a mobile ad hoc network protocol.

43. An apparatus comprising:
a router advertisement circuit configured for generating a router advertisement message according to a flooding distance vector routing protocol, the router advertisement message including reachability information specifying at least one reachable destination and a corresponding cost for reaching the at least one reachable destination, a source router identifier identifying the apparatus as having generated and output the reachability information, and an originating router identifier indicating a router having originated the reachability information independent of any other reachability information; and
an Internet Protocol (IP) network interface circuit configured for outputting the router advertisement message to adjacent routers according to the flooding distance vector protocol.

44. The apparatus of claim 43, further comprising:
a discovery circuit configured for detecting the adjacent routers in response to detecting respective unsolicited router messages from the adjacent routers, the discovery circuit further configured for causing the IP network interface circuit to connect to the adjacent routers via respective interface links, and
a local link state table configured for identifying connected adjacent routers, the discovery circuit configured for updating the local link state table to specify the adjacent routers, the respective interface links, and respective link status.

45. The apparatus of claim 44, wherein the IP network interface circuit is configured for outputting to one of the adjacent routers the local link state table based on the router advertisement circuit having determined that the corresponding interface link has maintained an active link status for at least a prescribed link stability interval.

46. The apparatus of claim 44, wherein the router advertisement circuit is configured for originating the reachability information based on the local link state table, the originating router identifier assigned to and identifying the router apparatus.

47. The apparatus of claim 43, wherein:
the IP network interface circuit is configured for receiving from one of the adjacent routers a second router advertisement message according to the flooding distance vector routing protocol and that specifies the at least one reachable destination and a corresponding second cost, and the originating router identifier;
the router advertisement circuit is configured for:
(1) disregarding the second router advertisement message based on determining the originating router identifier specified in the second router advertisement message corresponds to a router identity of the apparatus, and
(2) based on determining the originating router identifier specified in the second router advertisement message does not correspond to the identity of the router apparatus, determining the cost for the reachable destination specified in the router advertisement message based on the second cost specified in the second router advertisement message, and storing in a routing table entry the reachable destination, the corresponding cost, and the originating router identifier.

48. The apparatus of claim 47, wherein the IP network interface circuit is configured for outputting the second router advertisement to others of the adjacent routers according to the flooding distance vector routing protocol.

49. The apparatus of claim 43, wherein the apparatus is a mobile router configured for attaching to a mobile ad hoc network.

50. An apparatus comprising:
an Internet Protocol (IP) network interface circuit configured for receiving a router advertisement message that includes reachability information specifying at least one reachable destination and a corresponding first cost, a source router identifier identifying a router having generated and output the reachability information, and an originating router identifier indicating a router having originated the reachability information independent of any other reachability information; and
a router advertisement circuit configured for determining for said at least one reachable destination a corresponding second cost for reaching the reachable destination by the router apparatus, based on the corresponding first cost, the router advertisement circuit configured for generating a second router advertisement message, based on the router advertisement message, that includes second reachability information specifying said at least one reachable destination and the corresponding second cost, a second source router identifier identifying the apparatus as having generated and output the second reachability information, and the originating router identifier;
the IP network interface circuit further configured for outputting the router advertisement message and the second router advertisement message to an adjacent router according to a flooding distance vector routing protocol.

51. The apparatus of claim 50, further comprising:
a discovery circuit configured for detecting the adjacent router in response to detecting an unsolicited router message from the adjacent router, the discovery circuit further configured for causing the IP network interface circuit to connect to the adjacent router via an interface link; and
a local link state table configured for identifying connected adjacent routers, the discovery circuit configured for updating the local link state table to specify the adjacent router, the corresponding interface link, and a corresponding link status.

52. The apparatus of claim 51, wherein the IP network interface circuit is configured for outputting to the adjacent router the local link state table based on the router advertisement circuit having determined the corresponding interface link has maintained an active link status for at least a prescribed link stability interval.

53. The apparatus of claim 51, wherein:
the router advertisement circuit is configured for originating third reachability information based on the local link state table, and generating a third router advertisement message that includes the third reachability information for a prescribed destination, the originating router identifier for the third router advertisement message identifying said apparatus as the router having originated the reachability information;
the IP network interface circuit configured for outputting the third router advertisement message to the adjacent router.

54. The apparatus of claim 53, wherein the third reachability information specifies that the prescribed destination is unreachable.

55. The apparatus of claim 53, wherein the IP network interface circuit is configured for outputting the router advertisement message, the second router advertisement message, and the third router advertisement message according to the flooding distance vector routing protocol.

56. The apparatus of claim 50, wherein the apparatus is a mobile router configured for attaching to a mobile ad hoc network.

* * * * *